United States Patent Office

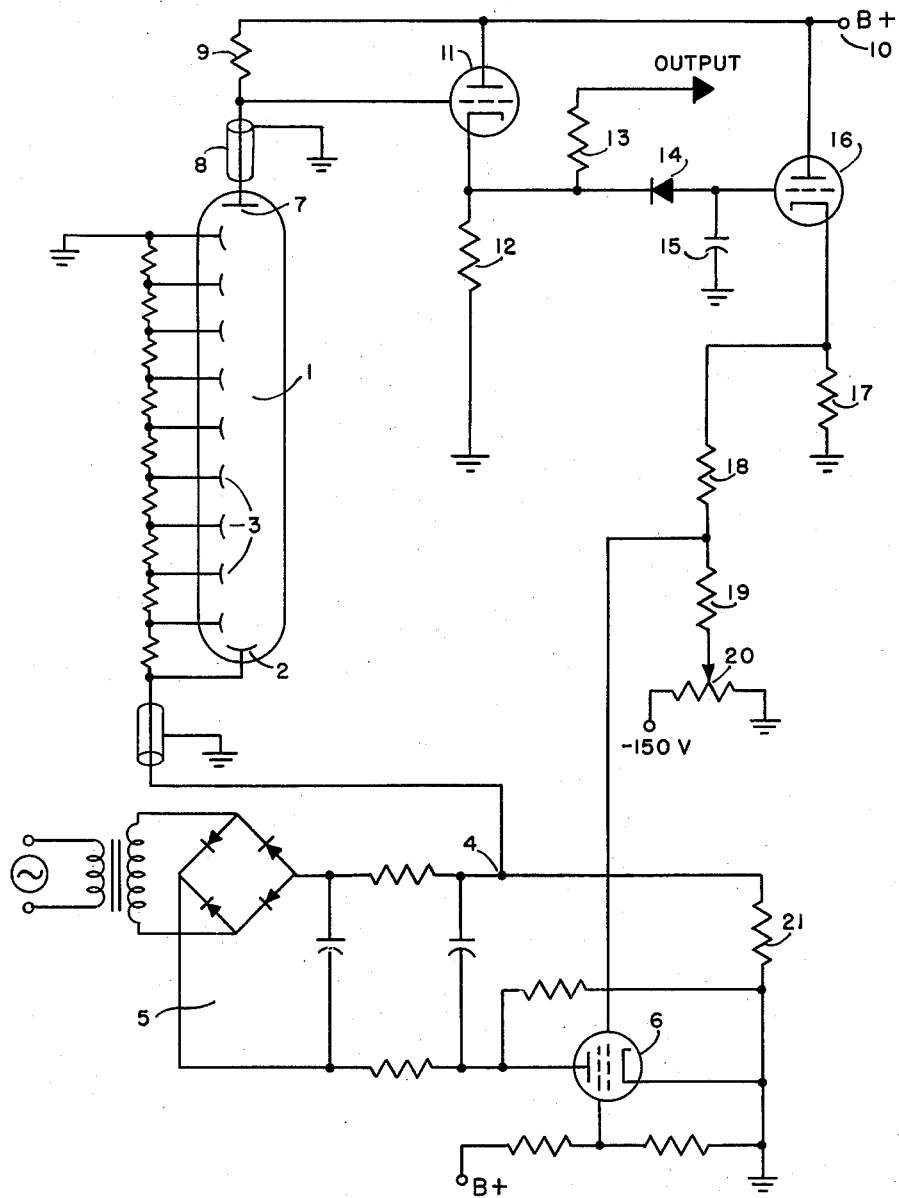

2,840,720
Patented June 24, 1958

2,840,720

MULTIPLIER PHOTOTUBE STABILIZING CIRCUIT

Albert B. Van Rennes, Wayland, Mass., assignor, by mesne assignments, to the United States of America as represented by the Secretary of the Navy Application March 19, 1956, Serial No. 572,592

5 Claims. (Cl. 250—207)

This invention relates generally to multi-channel pulse amplitude analyzers of the type employing photographic film as the pulse storage medium and, more particularly, to a stabilizing circuit for the multiplier phototube used in the optical scanner apparatus of the analyzer which subsequently reads the developed film record.

In one class of pulse storage systems employed to investigate the energy liberated in nuclear reactions, such as radio active disintegration, the amplitude of the pulse detected is permanently recorded as a discrete dot by exposing a continuously moving photographic film through a vertical window to the cathode ray screen of a synchroscope, the beam of which is being deflected vertically a distance proportional to the amplitude of the particular pulse and horizontally during the interval of this pulse, the position of each dot from a reference base line on the film thus being indicative of the pulse amplitude and the energy level of the nuclear event being observed.

In such so-called "dots-on-film" pulse recording systems, the nuclear event is subsequently interpreted by optically scanning the film with a light beam whose cross-sectional area is of approximately the same magnitude as the discrete pulse and counting the number of dots which lie within each of a number of consecutive amplitude levels on the film. A dot on the film within the particular amplitude level being observed will, as it passes through the scanner, partially obscure the light beam and generate a voltage pulse at the phototube output, which pulse may be then registered in a conventional pulse counter. In such optical scanning arrangements, there is one set of variables involving, for example, the light intensity of the scanning beam, the background transmission of the film, the cathode luminous sensitivity of the phototube, and the phototube's multiplication factor which, if not compensated for, can introduce sufficient shift in the level of the output pulses to cause improper functioning of the pulse counter. The effect of such variations as the above on the output pulse level can be substantially eliminated through the use of a multiplier tube stabilizing circuit functioning to hold the quiescent anode current of the phototube essentially constant in the presence of moderately slow operational changes. Such circuits as those heretofore resorted to to maintain this stabilization have employed feedback of a continuous nature as the control means and, consequently, the amplitude levels of the output pulses have been suppressed and distorted from their true values.

It is accordingly an object of the present invention to provide a feedback control circuit for a multiplier phototube in an optical scanning system which will maintain the quiescent phototube anode current constant despite slow fluctuations in the intensity of the scanning beam or variations in the background density of the film but which will allow any signal pulse to be linearly reproduced.

A further object of the present invention is to provide an intermittently operated feedback control circuit for a multiplier phototube which is automatically disabled when the anode current of the tube is rapidly changed in response, for example, to the scanning of a data pulse recorded on a photographic film strip.

A further object of the invention is to provide a non-linear feedback circuit for controlling the anode current of a multiplier phototube which will compensate for slight drifts in the anode current of this tube brought about by gradual changes in the tube characteristics but will not interfere with the wave form of any pulses produced in the anode circuit originating from data information stored on the photographic film strip being scanned.

Referring now to the drawing, a multiplier phototube 1, which constitutes one component of a conventional optical scanning mechanism, not shown, has its photo cathode so positioned as to be illuminated by a concentrated light beam passing through a photographically developed film strip on which pulse data is stored in the form of a multiplicity of discrete dots occurring at various amplitude levels. A suitable viewing aperture, also not shown, is interposed between the scanning beam and the moving photographic strip to permit the reading of only a selected energy channel corresponding to a specific pulse amplitude. High voltage negative operating potential for the individual dynodes 3 of the phototube is obtained from point 4 on the filtered side of a D. C. regulated power supply 5 which has as its control element a tetrode 6 connected to perform as a series impedance of variable amplitude for adjusting the load current and thereby the magnitude of the voltage at point 4. Anode 7 of the photomultiplier tube is coupled via a concentric conductor 8 and a load resistor 9 to a source of positive potential 10. The output of this phototube is connected to the control grid of a cathode follower stage 11 which has its cathode grounded through resistor 12. The output of this stage is in turn coupled via protective series resistor 13 to a utilization circuit, such as a pulse counter, and to a feedback circuit which controls the magnitude of the negative voltage appearing at point 4 of the regulated power supply and thereby the potential supplied to the dynodes of the multiplier phototube. This feedback circuit is composed of a cathode follower whose input circuit contains a negative peak measuring diode-detector made up of diode 14 and capacitor 15, and a resistive summation network formed by series resistors 18 and 19 and a reference potential tapped off potentiometer 20 connected between a source of negative potential and ground. This resistive summation network compares the amplitude of the positive output signal appearing across cathode resistor 17 of cathode follower 16 with the negative reference voltage whose magnitude is preset by the position of the movable contact of potentiometer 20 and produces an "error" signal indicative of their inequality, which signal is supplied to the control grid of tetrode 6 as its bias and thus determines the magnitude of the load current and the voltage at point 4 of the power supply.

Considering now the operation of the above circuit in the instance where the anode current of photomultiplier tube 1 is slowly changing from its quiescent value, it will be seen that the variation in anode potential of tube 7 reflecting this trend appears at a low impedance level across resistor 12 and is transmitted to the negative peak-diode-detector with the result that the voltage across capacitor 15 thereof moves in the same direction as anode 7. If, for example, the above variation in anode current of photomultiplier tube 1 came about as a decrease in the intensity of the scanning beam, the anode voltage 7 would be moving in a positive direction and the voltage across capacitor 15 would be increasing to follow this change. The plate current through triode 16 and voltage drop across resistor 17 would experience a similar increase and a "positive" error signal would exist at the junction of series resistors 18 and 19 connected between cathode resistor 17 and the moving tap of potentiometer 20. Since this error signal, as noted above, determines the grid bias of tetrode 6, the plate current through this tube would in turn experience a proportional increase and, as a result, the point 4 would be driven more negative, thereby increasing the operating potential on the various dynodes 3. This would in turn tend to increase the anode current and restore its value to the quiescent level. This action does not regenerate since the anode potential of the phototube now falls off and the signal appearing across cathode resistor 17 eventually decreases to its quiescent magnitude, causing the error signal to disappear.

In a similar manner, any changes, for example, in the phototube characteristics or the background intensity of the film strip being scanned, which would show up as increases in anode current of phototube 7, would have the opposite effect on the feedback circuit and result in a "negative" error signal at the control grid of tetrode 6, which would decrease the plate current of this tube and produce a negative potential of lesser amount at point 4 and at the dynode 3 of photomultiplier tube 1. This shift in voltage would tend to produce a decrease in phototube plate current to reestablish once more the quiescent value.

It will be recognized that while the feedback circuit will respond more rapidly to those variations in the characteristics of the photomultiplier tube and the background density of the film strip which result in an increase in anode current and the presence of a negative going pulse at the input of the detector, notwithstanding this selectivity, both types of anode current drift will be effective on the detector by virtue of their relatively long time constant.

In contradistinction to the above mode of operation when the scanning beam is interrupted by a dot recorded on the film strip, the rapid change in photocathode illumination causes a positive going pulse of relatively short duration to appear at the anode of the phototube. This pulse is reproduced at a lower impedance level at the cathode of triode 11 but has no significant effect on the negative peak measuring diode-detector due to the poling of the diode 14. This output pulse does not appreciably change the magnitude of the voltage across capacitor 15 since it has a relatively short duration and has to act through the relatively high backward resistance of diode 14. It will thus be seen that since the data signals are positively going pulses the feedback loop does not respond thereto and these pulses are linearly reproduced in the output circuit. The time constant of the detector circuit under this type of feedback condition which is proportional to the product of the capacitance of capacitor 15 and the backward resistance of diode 14 may be set to about one-tenth of a second. At usual film speeds signal pulses have a duration of less than one millisecond.

In a typical circuit using a type 931A multiplier phototube whose current amplification S varied as the 6.5 power of the voltage applied to the dynodes, it was found that the feedback loop held the quiescent phototube potential constant over a three or four decade variation in light reaching the photocathode. A 13% slow decrease in light at the cathode resulted in approximately a 2% slow increase in supply potential to maintain the original anode current. To insure near linearity between increments of light and output voltage, the quiescent operating point of the multiplier phototube was located at a potential well above the knee of the nonlinear region in the ninth dynode to anode volt ampere characteristic. A quiescent output voltage of sixty volts minimum from cathode follower 11 was found to be adequate for this purpose.

Other obvious modifications and variations of the present invention will be perceived in the light of the foregoing teachings. It is therefore intended that within the scope of the appended claims the invention may be practiced otherwise than as specifically described.

What is claimed is:

1. A control circuit for substantially eliminating drift in the quiescent anode current of a photomultiplier tube occasioned by aging of the tube or by slight changes in the illumination of the photosensitive cathode due to variations in the background density of the medium being scanned comprising, in combination, a relatively high negative potential source coupled to the interconnected dynodes of said phototube, a feedback control circuit connected between the output of said phototube and said potential source for changing the magnitude of said source in response to variations in the anode current of said tube, said feedback circuit containing a negative peak measuring diode-detector for rendering said feedback control circuit unresponsive to relatively rapid decreases in the output current of said phototube brought about by a sudden decrease in the illumination of the photosensitive cathode of said tube.

2. A control circuit for stabilizing the quiescent anode current of a multiplier phototube whose photosensitive cathode is adapted to be illuminated with a light beam of variable intensity comprising, in combination, a source of relatively high negative potential energizing the interconnected dynodes of said phototube, a feedback circuit connected between the output of said phototube and said voltage source for regulating the magnitude of the negative potential energizing said dynodes, said feedback circuit having a time constant means which discriminates against abrupt decreases in the anode current of said phototube and prevents these changes from affecting the magnitude of the potential coupled to the dynodes, said last-mentioned means including a negative peak measuring diode-detector.

3. In combination, a multiplier phototube having as components thereof a photosensitive cathode adapted to be illuminated with an intensity modulated light beam, a series of interconnected dynodes and an anode, a source of relatively high negative potential coupled to said dynodes, means for coupling the anode of said phototube to a cathode follower circuit for reproducing signals generated in the anode circuit of said tube at a lower impedance level, means for comparing the amplitude of the output signal appearing across the cathode resistor of said cathode follower stage with a reference voltage whereby an error signal is produced whenever the compared voltages are unequal, and means for utilizing said error signal to control the magnitude of the voltage applied to said dynodes whereby the anode current of said tube is effectively stabilized at its quiescent level, and means associated with said cathode follower for preventing rapid decreases in the amplitude of the anode current of said phototube brought about by a sudden decrease in the intensity of the light beam illuminating said photosensitive cathode from appearing in the output of said cathode follower.

4. A control circuit for stabilizing the quiescent anode current of a multiplier phototube whose photosensitive cathode is adapted to be illuminated by a light beam which scans a film strip on which the data is permanently recorded in the form of discrete dots comprising, in combination, a source of negative voltage coupled to the interconnected dynodes of said phototube, a negative peak detector, means for coupling output signals produced in the anode circuit of said tube to said negative peak detector, a cathode follower stage, means for connecting said negative peak detector to the input circuit of said cathode follower, and means for comparing the output signal from said cathode follower with a reference voltage whereby an error signal is produced whenever said output signal and said reference voltages are of equal magnitudes, and means for utilizing said error signal to vary the magnitude of the negative voltage applied to said dynodes, said last-mentioned means including a series impedance tube connected in the output of said source of negative voltage for varying the load current thereof.

5. A control circuit for stabilizing the quiescent anode current of a multiplier phototube whose photosensitive cathode is adapted to be illuminated by a light beam which is exposed to a film strip upon which data is scored in the form of discrete dots comprising, in combination, a first cathode follower, said cathode follower having its control grid coupled to the anode of said multiplier phototube and its cathode coupled to a source of reference voltage through a cathode resistor, a diode and storage capacitor connected in series across said cathode resistor, said diode being poled such as to pass negative pulses appearing at the cathode of said cathode follower stage to said storage capacitor, a second cathode follower, the control grid of said second cathode follower being connected to the juncture of said diode and said storage capacitor, a power supply, said power supply having as a component thereof a variable impedance vacuum tube connected in series with its output a source of reference voltage, means for comparing the magnitude of the voltage developed across the cathode resistor of said second cathode follower with said reference voltage to produce an error signal proportional to any inequality therebetween, means for coupling said error signal to said impedance tube to vary the magnitude of the output of said power supply, and means for energizing the dynodes of said multiplier phototube with the output voltage of said power supply.

References Cited in the file of this patent
UNITED STATES PATENTS

| | | |
|---|---|---|
| 2,412,423 | Rajchman et al. | Dec. 10, 1946 |
| 2,454,169 | Haynes | Nov. 16, 1948 |
| 2,605,430 | Marcy | July 29, 1952 |
| 2,707,238 | Fromm | Apr. 26, 1955 |
| 2,711,486 | Smyth | June 21, 1955 |